March 14, 1967 — A. M. YUILE — 3,308,846

RELIEF VALVE IMPROVEMENT

Filed Oct. 16, 1963

WITNESSES
Theodore F. Wrobel
A. J. Santantonio

INVENTOR
Arthur M. Yuile
BY
ATTORNEY

3,308,846
RELIEF VALVE IMPROVEMENT
Arthur M. Yuile, Pittsburgh, Pa., assignor to Canadian Westinghouse Company, Limited, Hamilton, Ontario, Canada
Filed Oct. 16, 1963, Ser. No. 316,589
6 Claims. (Cl. 137—487.5)

The present invention relates in general to a relief valve and more particularly to an improved arrangement for opening and closing a relief valve.

The A.S.M.E. Boiler and Pressure Vessel Code (1959), Section 8 relating to relief valves for unfired pressure vessels states as follows:

"(a) Safety and relief valves shall be of the direct spring-loaded type, except as permitted in (b).

"(b) Pilot valve control or other indirect operation of safety valves is not permitted unless the design is such that the main unloading valve will open automatically at not over the set pressure and will discharge its full rated capacity if some essential part of the pilot or auxiliary device should fail."

Section 1 of the same code for power boilers, states: "All safety valves shall be so constructed that failure of any part cannot obstruct the free and full discharge of steam from the valve. Safety valves shall be of the direct spring-loaded, pop-type . . . ."

The best types of relief valves, which are approved by both of these codes and are at present commercially available, are deficient in two important respects even when properly adjusted and properly lapped. Firstly, they commence "weeping" or "simmering," i.e., they pass a small flow of the fluid under pressure when the fluid pressure rises to within a range just below the predetermined relief pressure. In even the best relief valves available, the point at which "weeping" begins is approximately 10% below the predetermined relief pressure. Secondly, after the valves have relieved, they fail to reseat fully until the fluid pressure has fallen to a value considerably below the predetermined value.

At the present time relief valves are available that are opened and closed by a respective auxiliary hydraulic, pneumatic or electric power system, the system being controlled for this purpose by a "pilot controller" which measures the pressure and compares the resultant signal with a reference signal representative of the desired "popping" pressure. Such valves do not meet the above code requirements as they are not of the direct spring-loaded type.

The two disadvantages quoted above cause particular difficulty in the selection, setting and testing of relief valves intended for use in high pressure fluid systems which are designed to operate at pressures very close to the maximum allowable for the system. Examples of such systems are a nuclear reactor primary cooling system and test loops intended for testing components to be used in nuclear reactors. In such systems, owing to the need to conserve as many available neutrons as possible, the walls of the enclosures are of minimum thickness; and the design pressure, or the amount of pressure above the operating pressure, which can be tolerated is consequently very limited.

Accordingly, it is the general object of this invention to provide a new and improved relief valve arrangement.

It is a more particular object of this invention to provide an assistant which will cause a relief valve to open and close more efficiently.

Still another object is to reduce the valve closing force at a point at and above a predetermined relief pressure.

A further object is to increase the valve closing force at a point below a predetermined relief pressure.

Another object of this invention is to reduce the time required to fully open or fully close a relief valve.

Briefly, the present invention accomplishes the above-cited objects by providing a primary operator which applies the major portion of the available valve closing force and by providing a releasable assistant or secondary operator which applies a minor portion of the available closing force. In one embodiment of this invention, the primary operator comprises a direct acting compression spring as found in a conventional direct spring-loaded type; and the assistant or secondary operator comprises a solenoid and an armature, with the armature seated upon a non-magnetic extension which in turn engages a valve spindle secured to the valve disc. Power to energize the solenoid is supplied from a suitable power source through a normally closed, pressure sensitive switch that communicates by means of a tube with the interior of a pressure containment system, whose pressure is to be kept below a predetermined value. When the solenoid is energized, it applies to the armature, and thus to the valve disc, a portion of the closing force with the remainder of the closing force being provided by the compression spring. When the set relief pressure in the system is reached, the pressure switch opens and deenergizes the solenoid. At this point with the elimination of that portion of the closing force applied by the solenoid, the pressure within the system is appreciably higher than the opposing force of the spring alone and causes the relief valve to open rapidly to its full-open position. When the pressure within the system is reduced to a point slightly below the set relief pressure, the pressure switch contacts close and energize the solenoid. Thus, the additive forces now being contributed by the spring and the energized solenoid are greater than the pressure within the system and therefore quickly actuate the relief valve to its closed position. Thus, the instantaneous removal of a portion of the closing force permits the relief valve to open at the set relief pressure and eliminates the "weeping" through the relief valve which normally occurs upon approaching the set relief pressure. Furthermore, the instantaneous application of a portion of the closing force permits the relief valve to close at a point much closer to the set relief pressure than was heretofore possible.

Further objects and advantages of the invention will become apparent as the following description proceeds; and features of novelty, which characterize the invention, will be pointed out in particularity in the claims annexed to and forming a part of this specification.

Reference may be had to the accompanying drawings in which.

Figure 1:
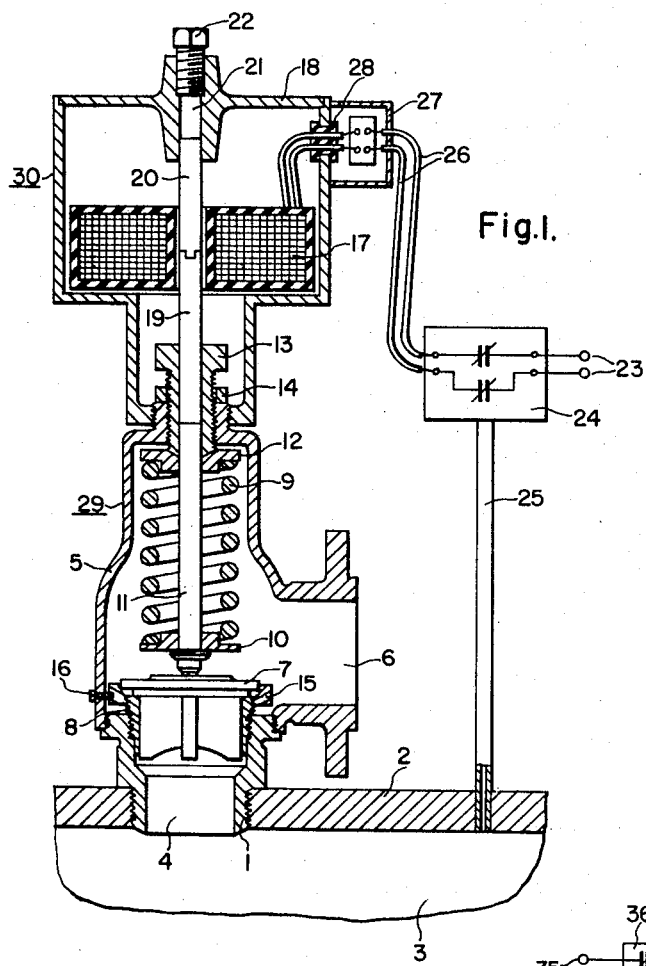
FIGURE 1 is a longitudinal section through a relief valve with which a secondary operator comprises a solenoid controlled by a pressure sensitive electric switch.

Referring to FIG. 1 of the drawings, the exemplary form of the invention shown therein is adapted for use with a conventional spring-loaded type relief valve 29 and comprises a valve body 1, which fits into a corresponding bore in a wall 2 of an enclosure 3 (only part is shown) containing fluid under pressure with the body 1 providing an inlet 4 to the valve 29 for such fluid. The body 1 is secured to the wall 2 by means such as threads and/or seal welding. A bonnet 5, screw-threaded to, seal welded to, or formed as an integral part of the body 1, provides an outlet 6 for fluid that has been relieved by the valve 29. Fluid entering the inlet 4 exerts pressure against a valve closure or disc 7, which is held in contact with its seat 8 by a compression spring 9. The spring 9 is in compression between a bottom washer 10 on a valve spindle 11 and a movable top washer 12, the predetermined pressure at which the valve 29 will open being determined by the compression of the spring 9. The spring compression is adjusted conventionally by means of an adjustable screw 13 working in a corresponding screw-threaded bore in the bonnet 5 with a lock-nut 14 being provided. An adjusting ring 15 is provided to vary the blow-down time of the valve 29, the ring 15 being locked in position by means of a pin 16.

In the embodiment to be described a releasable, secondary operator or assistant 30 comprises a solenoid coil 17, enclosed in a solenoid housing 18, and an armature 20. The valve spindle 11 is freely slidable in a bore in the compression screw 13 and is provided with a non-magnetic extension 19, while the screw 13 is long enough to serve as a guide and support means therefor. The armature 20 of the solenoid consists of a rod of magnetic material having its lower end seated on the upper end of the extension 19 and its upper end sliding in a bore 21 in the housing 18, with the upper end of the bore 21 being closed by a threaded and/or seal welded plug 22. Power to operate the assistant 30 is supplied from terminals 23 of a suitable power supply through a normally-closed, pressure-sensitive switch 24 that is connected by a tube 25 to the interior of the enclosure 3. The exact construction of the switch 24 is not part of this invention and, accordingly, the switch has been shown diagrammatically. Electrical leads 26 from the switch 24 to the solenoid coil 17 pass through a terminal box 27 and a seal plug 28 in one wall of the solenoid housing 18.

In operation, the compression screw 13 is rotated until the closing force provided by the spring 9 permits the valve 29 to relieve the pressure in the enclosure 3 at the required value or set point, and the screw is then locked in position by the lock-nut 14. The solenoid is so designed that, when the coil 17 is supplied with operating current from the terminals 23, it applies to the armature 20, and thus to the valve spindle 11, approximately 10% of the closing force provided by the spring 9. Thus the spring 9 comprises the primary, major operator for the valve, while the solenoid comprises a secondary operator or assistant. In some embodiments, means, such as an adjustable resistor, may be provided for adjusting the value of the solenoid operating current, so that the solenoid operating force can be adjusted to the required proportion of the spring force, which, of course, can be other than the 10% noted above, depending on operating conditions. Some change in the solenoid operating force may also be required when the closing force of the spring has been adjusted as described above.

As the fluid pressure applied to the valve closure 7 increases, the pressure more and more counterbalances the closing force applied by the spring 9, and the force holding the closure on its seat is progressively reduced. In conventional spring-operated valves, as noted briefly hitherto, when the resultant downward force has decreased to approximately 10% of maximum value provided by the spring, the valve begins to weep. With a valve constructed in accordance with this invention, even when the fluid pressure has increased to just below the predetermined value and the closing force provided by the spring 9 is nearly counter-balanced, the closing force provided by the assistant 30 is sufficient to hold the valve tightly closed, until the predetermined pressure is detected by the pressure switch 24 and the assistant 30 is released.

The pressure sensitivity of the pressure switch 24 is higher than that obtainable with conventional spring-operated relief valves; and, as a specific example, pressure-operated electric switches with a sensitivity of ±½% are commercially available. The relief valve of the invention, therefore, has the sensitivity of that of the switch 24, which is far superior to that of conventional relief valves and also meets the code requirements given above.

Moreover, owing to the higher sensitivity of the switch 24, the pressure at which the valve 29 will close again after opening is nearer to the preset value than is possible with a conventional spring operated valve. This is because the force applied by the assistant 30 to close the valve, upon detection of a relatively small drop in pressure below the set point of the switch 24, is equal to that which would have been applied by the spring if the pressure had decreased by approximately 10%. When the contacts of the pressure switch 24 close, operating current is supplied to the solenoid coil 17; and the valve closing force provided by the assistant 30 is applied relatively suddenly to the valve 29, so that the valve closes much faster than it would under the effect of the spring alone, thereby resulting in considerably reduced total blowdown.

The operation of the relief valve 29 described above meets the requirements of the two codes quoted above, since failure of the assistant 30 to provide any operating force to the valve simply means that the valve will operate in its normal spring-closing mode. Similarly, upon failure of the power source to provide operating current to the solenoid 17, the valve 29 operates in its normal spring-closing mode. The extensions 19 and 20 are freely slidable in their guides and in the bore of the solenoid coil and, therefore, when released the operator assistant does not provide any appreciable resistance to the movement of the valve stem 11.

Although it is highly unlikely that the pressure switch 24 will fail, there are two remote possibilities of malfunction. The first possibility of malfunction is that the contacts in the switch 24 will fail to close due, for example, to dirt or corrosion, whereupon no power is supplied to the solenoid 17. The second possibility of malfunction is that the contacts of switch 24 will fail to open. This latter possibility can be avoided by the proper rating of the switch for the conditions under which it is employed or by using a plurality of pressure switches (or a plurality of contacts within the switch) arranged electrically in series. The use of a plurality of contacts or switches 24 in series will assure the fact that at least one contact or switch will open, as a series of contacts or pressure switches will not weld closed simultaneously.

Figure 2:
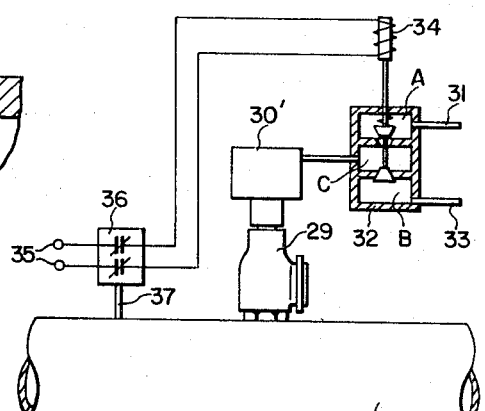
FIG. 2 is a schematic of a system for a relief valve with which the secondary operator is a fluid-pressure actuated piston, diaphragm or bellows, the assistant being controlled by a pressure sensitive electric switch.
Figure 3:
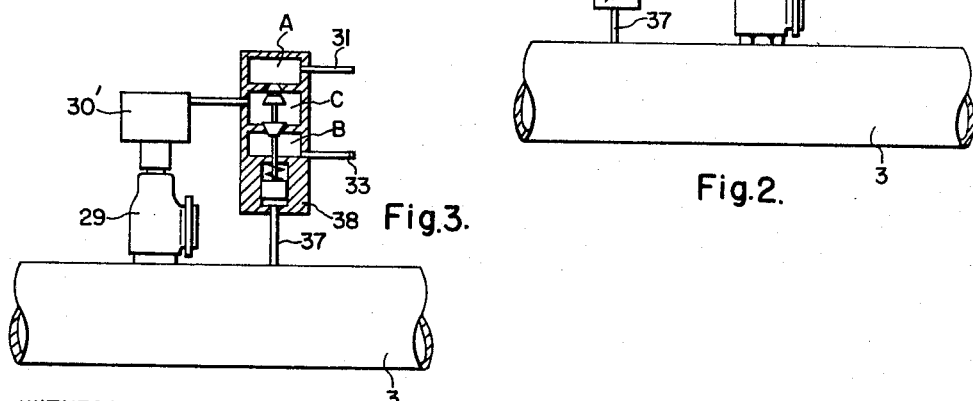
FIG. 3 is a schematic of a system for the relief valve of FIG. 2, with which the secondary operator or assistant is controlled by a pneumatic or hydraulic switch.

In the embodiments illustrated by FIGS. 2 and 3, the relief valve 29 is of the same construction as that shown in FIG. 1, but the secondary operator or assistant 30' consists of a fluid-operated member, such as a piston, diaphragm or bellows, bearing against the valve stem. The construction of such a fluid-operated assistant will be apparent to those skilled in the appropriate art, and no construction details thereof are shown.

In the embodiment of FIG. 2 the assistant 30' is supplied with fluid under pressure (gas or liquid) via a supply pipe 31 and an electrically operated or solenoid valve 32. An operating winding 34 of the valve 32 is supplied with operating current, as required, from source terminals 35 via a pressure switch 36 of the same type as that shown in FIG. 1 with the switch being connected by a pipe 37 to the enclosure 3. When the winding 34 is energized, the ports A and C are connected together, while the port B leading to an exhaust pipe 33 is closed, so that the fluid pressurizes the assistant 30' and renders it operative. When the winding 34 is deenergized, valve 32 will close port A and connect ports C and B together, so that the interior of the assistant 30' is connected to the exhaust pipe 33 relieving the pressure and therefore making the assistant inoperative. Fluid pressure is only applied to the assistant 30' while the winding 34 is energized under the control of the switch 36. Thus, the relief valve 29 will revert to its normal mode of operating under the control of its main spring alone, upon failure of the fluid supply, the electric supply, and/or the switch.

The parts that are common to the systems of FIGS. 2 and 3 are given the same reference numerals, and it will be seen that in the system of FIG. 3 a fluid pressure control relay 38 replaces the valve 32 and switch 36 of the system of FIG. 2. The control relay 38 is responsive to the pressure of fluid supplied thereto from the enclosure 3 via the pipe 37. As long as the pressure detected is below the predetermined value, the port A is open and fluid pressure is applied through the port C and thence to the assistant 30'. When the pressure in enclosure 3 rises to the predetermined value, the port A is closed and the ports B and C are connected together, so that the fluid pressure is relieved from the assistant 30' and it becomes inoperative.

Although it has been suggested that the operator assistant 30' provide a closing force equal to approximately 10% of that provided by the spring, other embodiments may require a larger or smaller force from the assistant 30', for example, as high as 25% and as low as 5%.

Although in the embodiments above a single pressure-operated switch is described, in other embodiments a number of such switches in parallel may be employed to cause progressive application of the total closing force available from the operator assistant, after the initial application of a minimum additional closing force.

What is claimed as new is:

1. A relief valve arrangement comprising a seat, a disc engageable with said seat, a spring urging said disc into engagement with said seat with a major part of the available seat closing force, a solenoid, an armature adjacent said disc, said armature capable of being slidably attracted into the central opening of said solenoid upon the solenoid being energized so as to apply a minor part of the available disc closing force, and a pressure detector which releases said minor part of said available seat closing force upon interruption of operating current to said solenoid.

2. A relief valve comprising a valve body having an inlet side, a bonnet having an outlet side and sealably secured to said valve body, a housing sealably secured to said bonnet and capable of maintaining a pressure, a seat secured to said valve body, a disc within said bonnet engageable with said seat, a spring within said bonnet urging said disc into engagement with said seat with a major part of the available seat closing force, a valve spindle engageable with said disc, and a solenoid within said housing having an armature, said armature being longitudinally aligned with said spindle and capable of being slidably attracted into the central opening of said solenoid upon the solenoid being energized so as to apply a minor part of the available disc closing force by urging said spindle against said disc.

3. A relief valve for an enclosure comprising a valve member that is moved to open and close the valve and adapted to open the valve at a predetermined fluid pressure in said enclosure, biasing means for applying to said valve member a major part of the available valve closing force, a releasable assistant means comprising a solenoid for applying to said valve member a minor part of the available valve closing force, said minor part having a constant value, and means responsive to said fluid pressure for releasing said releasable assistant means upon reaching said predetermined pressure whereby the fluid pressure to be relieved from said enclosure acts upon said valve member to open the valve.

4. The combination of claim 3 wherein said releasing means includes at least one pressure switch separate from the valve.

5. The combination of claim 3 wherein said releasing means for said solenoid comprises a pressure switch adapted to be operated by the pressure of the fluid in the enclosure and operative to release said solenoid by breaking the supply of operating current thereto.

6. The combination of claim 5 wherein said releasable assistant means includes a solenoid operated three way valve which at a first position utilizes another fluid pressure for applying the minor closing force and which at a second position releases said other fluid pressure.

References Cited by the Examiner

UNITED STATES PATENTS

| 2,214,963 | 9/1940 | Jurs | 137—492 |
| 2,342,472 | 2/1944 | Jurs | 137—492 X |
| 2,944,564 | 7/1960 | Pettey | 137—529 |
| 3,041,969 | 7/1962 | Filstrup | 251—75 X |
| 3,229,713 | 1/1966 | Wiegand | 137—467 |

FOREIGN PATENTS 1,298,599  6/1962  France.

OTHER REFERENCES

Bopp & Reuther G.m.b.H.; Mannheim-Waldhof, Gesteverte Sicher Neitsventile, March 1962, page 401, sheet 1, copy in Group 440.

M. CARY NELSON, *Primary Examiner.*

M. SCHWADRON, *Examiner.*